US009433238B2

(12) United States Patent
Van Der Eerden et al.

(10) Patent No.: US 9,433,238 B2
(45) Date of Patent: Sep. 6, 2016

(54) MASS-DISTRIBUTING DEVICE AND MOULDING DEVICE COMPRISING A MASS DISTRIBUTING DEVICE OF THIS TYPE

(71) Applicant: MAREL TOWNSEND FURTHER PROCESSING B.V., AV Boxmeer (NL)

(72) Inventors: Hendricus Franciscus Jacobus Maria Van Der Eerden, Gemert (NL); Dirk Meskendahl, Kranenburg (DE); Thomas Willem Dekker, Nijmegen (NL)

(73) Assignee: MAREL TOWNSEND FURTHER PROCESSING B.V., Boxmeer (NL)

( * ) Notice: Subject to any disclaimer, the term of this patent is extended or adjusted under 35 U.S.C. 154(b) by 0 days.

(21) Appl. No.: 14/723,069

(22) Filed: May 27, 2015

(65) Prior Publication Data
US 2015/0250226 A1  Sep. 10, 2015

Related U.S. Application Data

(62) Division of application No. 13/259,923, filed as application No. PCT/NL2010/000058 on Mar. 26, 2010, now Pat. No. 9,044,029.

(30) Foreign Application Priority Data

Mar. 26, 2009  (NL) ..................................... 2002672

(51) Int. Cl.
*A23P 1/10* (2006.01)
*A23L 1/00* (2006.01)
*A22C 7/00* (2006.01)

(52) U.S. Cl.
CPC .............. *A23P 1/105* (2013.01); *A22C 7/0069* (2013.01); *A22C 7/0092* (2013.01); *A23L 1/0073* (2013.01); *A22C 7/003* (2013.01); *A22C 7/0076* (2013.01); *A23V 2002/00* (2013.01)

(58) Field of Classification Search
CPC  A22C 7/0023; A22C 7/0069; A22C 7/0092; A22C 17/0006; A22C 7/0076; A22C 7/003; A23P 1/105; A23V 2002/00
USPC ........ 426/512, 513, 516, 518; 425/127, 195, 425/218, 219, 237, 241, 256, 363, 365, 402, 425/447, 449, 572, 576, 588
See application file for complete search history.

(56) References Cited

U.S. PATENT DOCUMENTS

| 3,137,029 A | 6/1964 | Zolt |
| 4,460,611 A | 7/1984 | Suzuki |

(Continued)

FOREIGN PATENT DOCUMENTS

| WO | WO 00/30458 A1 | 6/2000 |
| WO | WO 2004/002229 A2 | 1/2004 |

*Primary Examiner* — Seyed Masoud Malekzadeh
(74) *Attorney, Agent, or Firm* — Birch, Stewart, Kolasch & Birch, LLP (57) ABSTRACT

A mass-distributing device for supplying a mass of foodstuff starting materials suitable for consumption, in particular a meat mass, to one or more mold cavities of a molding member for molding three-dimensional products from the mass is provided. The device comprises a housing, which has an open side which can be turned towards the molding member, in which a flexible abutment element for the housing to abut the molding member is arranged. In the housing, a through-passage for the mass extends from an introduction opening in the housing to a discharge, which discharge opens at the open side of the housing. Pressure means are provided in order to position the flexible abutment element under pressure against the plane of the molding member comprising one or more mold cavities, the pressure means being designed to set contact pressures in separate zones of the flexible abutment element.

20 Claims, 6 Drawing Sheets

(56) References Cited

U.S. PATENT DOCUMENTS

| | | |
|---|---|---|
| 4,506,184 A | 3/1985 | Siddall |
| 4,957,425 A | 9/1990 | Fay |
| 5,534,073 A | 7/1996 | Kinoshita et al. |
| 5,923,408 A | 7/1999 | Takabayashi |
| 6,809,802 B1 | 10/2004 | Tsukamoto et al. |
| 7,018,572 B2 | 3/2006 | Feist et al. |
| 7,597,549 B2 | 10/2009 | Van Esbroeck et al. |
| 7,641,840 B2 | 1/2010 | Choi et al. |
| 7,976,303 B2 | 7/2011 | Van der Eerden et al. |
| 8,215,946 B2 | 7/2012 | Ganapathisubramaniian et al. |
| 2005/0220932 A1* | 10/2005 | van der Eerden ... A22C 7/0069 426/1 |
| 2007/0228589 A1* | 10/2007 | Choi ............... B82Y 10/00 264/39 |
| 2009/0134308 A1 | 5/2009 | Van der Eerden et al. |
| 2009/0134544 A1 | 5/2009 | Van der Eerden et al. |

\* cited by examiner

MASS-DISTRIBUTING DEVICE AND MOULDING DEVICE COMPRISING A MASS DISTRIBUTING DEVICE OF THIS TYPE

CROSS-REFERENCE TO RELATED APPLICATIONS

This application is a Divisional of application Ser. No. 13/259,923, filed on Sep. 23, 2011, now issues as U.S. Pat. No. 9,044,029, which is the National Phase of PCT International Application No. PCT/NL2010/000058, filed on Mar. 26, 2010, which claims priority under 35 U.S.C. 119(a) to Patent Application No. 2002672, filed in The Netherlands on Mar. 26, 2009, all of which are hereby expressly incorporated by reference into the present application.

BACKGROUND OF THE INVENTION

1. Field of the Invention

According to a first aspect, the invention relates to a mass-distributing device for distributing a mass of foodstuff starting materials suitable for consumption, in particular a meat mass, over one or more mould cavities of a moulding member for moulding three-dimensional products from said mass.

2. Description of Background Art

A mass-distributing device of this type is known, for example, from WO 2004002229. In order to cooperate with a cylindrical moulding roller as moulding member, the outer circumference of which is provided with one or more mould cavities, this known device comprises a virtually semicircular housing comprising a through-passage extending in the radial direction and having an inlet for the mass from a supply device and pump and having a discharge for the mass to the mould cavities in the moulding roller. The side of the mass-distributing device facing the moulding roller comprises a curved plate made from a flexible material, inter alia in order to compensate for possible deviations in the radius of the moulding roller. This plate is provided with a passage for said discharge. During use, a pressure cushion which extends in the circumferential direction of the moulding roller, in other words in the longitudinal direction of the flexible plate, and which can be pressurized by means of a suitable pressure medium, pushes the flexible plate against the outer circumference of the moulding roller in a sealing manner. During use, mass is (semi)continuously fed to the mass-distributing device by means of a pump or another supply member, with in each case either one mould cavity or a row of mould cavities situated in the axial direction of the moulding roller and arranged substantially next to one another being filled during rotation of the moulding roller. With this known device, products can be moulded at high speeds.

Since it has now been found that during use of this known moulding device with mass-distributing device there is a risk of the final product showing a number of undesirable deviations, in particular a lip or appendage on in particular the outer circumference of the moulded product, and inclusions of air which may have an undesirable effect on the behaviour of the moulded product during subsequent processing steps, such as shrinking during frying, baking, etc.

SUMMARY OF THE INVENTION

It is an object of the invention to provide an improved mass-distributing device, which does not suffer or suffers to a lesser degree from said shortcomings, or to provide a usable alternative.

This object is achieved according to the invention by a mass-distributing device for supplying a mass of foodstuff starting materials suitable for consumption, in particular a meat mass, to one or more mould cavities of a moulding member for moulding three-dimensional products from said mass, comprising a housing, which has a side which is designed to be turned towards a moulding member, which side is provided with a flexible abutment element for abutting the moulding member, in which a through-passage for said mass extends in the housing from an introduction opening in the housing to a discharge, which discharge opens at the side of the housing which is designed to be turned towards the moulding member, in which the discharge and the moulding member can be moved relative to one another in a relative direction of movement, and in which pressure means are provided in order to position the flexible abutment element under contact pressure against a face of the moulding member comprising one or more mould cavities, and in which the pressure means are designed to set contact pressures in separate zones of the flexible abutment element. In other words, the pressure means are designed such that different zones of the flexible abutment element can be pressed against the moulding member at different contact pressures.

The mass-distributing device according to the invention—also referred to as filling shoe—comprises a housing with an introduction opening for the mass to be moulded, which introduction opening is usually connected to a supply device for said mass via a supply member, such as a pump or screw. One side of the housing is, for example, open, at least partly. This open side forms the discharge side of the housing which can be turned towards the moulding member. In other words, this open side is directed towards the moulding member with mould cavities to be filled with the mass during use. The flexible abutment element for the housing to abut the moulding member is arranged on the open side. The flexible abutment element is, for example, formed by a flexible abutment plate. The open side is provided with the flexible abutment element for the housing to abut the moulding surface of the moulding member, which contains the mould cavities, and thus to close off a mould cavity, at least during at least a part of the filling process. In the housing, a through-passage is provided which extends from the introduction opening to a discharge. This discharge is situated on the open side and usually adjoins a filling opening provided in the flexible abutment element, or extends through it. In order to distinguish zones which are still to be described in more detail, this discharge and/or filling opening is also referred to as filling area in the context of this description. Using a certain filling pressure, mass is pressed into a mould cavity from the discharge when this mould cavity is connected to the discharge, in other words when the moulding member performs a relative movement with respect to the filling shoe when the mould cavity passes the filling area. The filling pressure is determined, inter alia, by the settings of the supply member used and the geometry of the through-passage and, if applicable, of the filling opening. Furthermore, pressure means are provided to push the flexible abutment element during use by means of pressure against the surface of the moulding member which is provided with the mould cavities, such as the outer circumferential surface of a moulding roller or drum. According to the invention, these pressure means are designed such that different zones of the flexible abutment element can be pushed against the moulding member at different contact pressures. This makes it possible, depending on the progress of the filling process, to set the contact pressures in the different zones during the filling process of the mould cavities of a moulding member. With the above-described known device, the flexible plate is pressed onto the moulding member at a uniform contact pressure during use and no zones are distinguishable. In one embodiment, the pressure means comprise separate pressure means for each zone which can be set separately. In another embodiment, different zones which are to exert substantially the same contact pressure are served by pressure means which are common to those zones. As, with a moulding device with a continuous supply of mass at, usually, a substantially constant filling pressure, the mass-distributing device is often stationary with respect to a moulding member moving past this device, in particular an endless moulding member, such as a moulding roller or drum, each of the different pressures can be set to a desired value for the respective mass and mould cavities which value does not have to vary for the respective zone over time for a certain type of product, but may be constant and preferably is also constant. Due to the different pressures which are exerted by the different zones of the flexible abutment element on the moulding member and the mass, which is and has been introduced into a mould cavity, it is possible to effectively prevent or reduce deviations from the desired shape, in particular inclusions of air during filling and producing lips on a moulded product.

In a preferred embodiment, in particular for a meat mass, the pressure means are designed to separately setting contact pressures in a pre-filling zone and a post-filling zone of the flexible abutment element. In other words, with this preferred embodiment, the pressure means comprise both pre-filling zone pressure means for setting the contact pressure in the pre-filling zone of the flexible abutment element, and post-filling zone pressure means for setting the contact pressure in a post-filling zone of the flexible abutment element. As has already been indicated above, the mass-distributing device is usually stationary with respect to a moulding member moving past this device. Said zones are linked to the relative movement—during the filling process—of the mass-distributing device and the mould cavity/cavities of the moulding member to be filled. The pre-filling zone is a section of the flexible abutment element which is situated upstream from, advantageously directly adjoining, the filling area, viewed in the relative direction of movement of the moulding member with respect to the mass-distributing device. Likewise viewed in said direction of movement, the length of the pre-filling zone is advantageously at least equal to the largest dimension of a mould cavity in said direction. In this pre-filling zone, a mould cavity to be filled with mass is covered by the flexible abutment element at a certain contact pressure in such a manner that leakage of mass in the upstream direction, in other words counter to the direction of movement, is prevented. This could occur if the downstream start of a mould cavity slides into the filling area and the mass, which is pressed into the mould cavity by means of the filling pressure of the supply member, moves through the mould cavity to the upstream end which is situated opposite the start or beyond that end due to the lower contact pressure (atmospheric or even lower with forced suction) compared to the filling pressure. Preferably, however, in addition to the prevention of leakage of mass, it is on the other hand possible for air to escape from the mould cavity. The contact pressure to be set in the pre-filling zone depends to a large degree on the starting material, the geometry of the through-passage and the mould cavity/cavities of the moulding member. Usually, the contact pressure in the pre-filling zone is in a range around the filling pressure, for example in a range of the filling pressure ±1 atmosphere. This pre-filling zone pressure can readily be determined experimentally. If desired, the contact pressure in a pre-filling zone comprising several parts can be set in stages. In a further embodiment, the contact pressure in the pre-filling zone can be as low as 0 bar.

In a similar manner, the post-filling zone is a section of the flexible abutment element which, viewed in the described direction of movement, is situated downstream from the filling area. During use, the post-filling zone pressure means press this zone of the flexible abutment element against the moulding member at a contact pressure which is higher than the filling pressure, so that leakage of mass in the direction of movement is also prevented during filling, in other words to the downstream start of the mould cavity. Expediently, the length of the post-filling zone is at least equal to the largest dimension of a mould cavity, said length and largest dimension again being viewed in the direction of movement. In addition, this contact pressure, which is greater than the filling pressure, exerts a force on the mass filled into the mould cavity for some time after filling, which is advantageous for some types of mass, such as meat masses.

In a further preferred embodiment, the pressure means are designed to separately set the contact pressure in at least one levelling zone, which adjoins the filling area in the downstream direction, of the flexible abutment element. In the levelling zone, which is situated downstream of the filling area and upstream from the post-filling zone, a levelling means, such as a blade which advantageously forms an integral part of the flexible abutment element, such as an acute angle of said abutment element, is pressed against the moulding member at a contact pressure, which contact pressure is able to level off the mass in the mould cavity and to cut fibres, tendons, muscles, etc. which are present in the mass, such as for example in the case of a meat mass. In an alternative embodiment, the levelling means is arranged in a fixed position, independently of the filling pressure applied, at a contact pressure which may or may not be presettable. In this alternative embodiment, the contact pressure is not controlled dynamically.

In a further preferred embodiment, the pressure means are designed to set the contact pressure in a relaxation zone of the flexible abutment element, which zone adjoins the post-filling zone downstream. The relaxation zone is a zone which is situated downstream of the filling zone, where a mould cavity is again covered by the flexible abutment element at a contact pressure between the flexible abutment element and moulding member which allows gases, for example air, which are present in the mass with which the mould cavity is filled and which are compressed as a result of the filling operation, to expand. The contact pressure in the relaxation zone is therefore lower than the filling pressure. The relaxation zone is usually the last zone of the flexible abutment element which is passed by the mould cavity.

According to a further preferred embodiment, the flexible abutment element has an entry side—adjacent to the first zone, usually the pre-filling zone—which runs obliquely upwards counter to the direction of movement of the moulding member. If mass has nevertheless leaked in the upstream direction, this is carried along by the (relative) movement of the moulding member in between the flexible abutment element and the moulding member and is still forced into a mould cavity by the entry side which together with said moulding member forms a kind of funnel, as it were. To this end, the entry side is advantageously formed in the shape of a V the tip of which is turned away from the moulding member and which forces the entrained mass towards the centre.

Preferably, the pressure means comprise at least one pressure element for each zone, which extends in a direction transverse to the longitudinal direction of the flexible abutment element. Each of the pressure elements is, for example, elongate, with each pressure element extending in the transverse direction of the flexible abutment element and/or the moulding member. In other words, each pressure element can extend transversely with respect to the relative direction of movement of the moulding member. The pressure elements can each be set separately to a suitable, preferably predetermined contact pressure, that is to say that different contact pressures can be set for each zone.

In this case, it is possible for each pressure element to be expandable under fluid pressure and to be connected to a source of pressure fluid which is under superatmospheric pressure, preferably a gas, for example pressurized air. Each pressure element comprises for example one or more connecting couplings for connecting the pressure elements to a source of pressurized fluid, such as pressurized air. The pressure elements each comprise, for example, a pressure cushion or hose or bellows. However, the pressure elements may be designed differently and, for example, comprise (pneumatic) cylinders. For example, one or more pressure elements may expand electrically rather than as a result of fluid pressure.

In one embodiment, each pressure element comprises an elongate profiled section which extends in the transverse direction of the flexible abutment element, and in which, in the mass-distributing device, several elongate profiled sections are arranged at a distance from one another on a side of the flexible abutment element which is designed to be turned away from the moulding member, and in which the member of each pressure element which can expand under fluid pressure engages with or, if desired, is connected to the elongate profiled section of said pressure element in order to exert a pressure force on the flexible abutment element via the elongate profiled section. The elongate profiled sections can direct the contact pressures locally into the flexible abutment element, so that the contact pressures can be accurately set for each zone.

In order to prevent leakage along the longitudinal edges, the pressure means are advantageously also designed to set the contact pressure between the abutment element and the moulding member in one or both edge zones situated along the longitudinal edges of the flexible abutment element. Such longitudinal edge zone pressure means are advantageously pressure elements which extend in the longitudinal direction of the flexible abutment element and are expandable under fluid pressure, which pressure elements are situated on the longitudinal edges of the flexible abutment element and are each connected to a source of pressure fluid under superatmospheric pressure. The pressure means of the edge zones may be designed in accordance with the pressure elements of the other zones, as described above. In that case, however, the elongate pressure elements run in the longitudinal direction of the flexible abutment element and/or the moulding member, with a cylindrical moulding member running in the circumferential direction of said moulding member.

It is possible for the pressure means to be provided with one or more pressure sensors in order to detect the current contact pressure in each zone of the flexible abutment element. Each zone then preferably has at least one pressure sensor by means of which the contact pressure in said zone can be detected. The pressure sensors are, for example, connected to a control unit which receives the contact pressures detected by the pressure sensors. The control unit is designed to control the pressure elements in order to set the contact pressures in the different zones. By means of the pressure sensors and the control unit, it is possible to control the contact pressures accurately.

For example, the control unit comprises a memory for storing one or more sets of desired pressure values for the pressure means. For example, it is provided that with a certain moulding member which comprises certain mould cavities, a set of pressure values for the pressure means is stored. These stored pressure values may, for example, be adapted to the dimensions of the mould cavities and/or the filling pressure which is used to fill these mould cavities with mass. For example, it is provided that the moulding member is automatically recognized so that the associated set of stored pressure values is automatically selected.

For example, the control unit comprises an algorithm which controls the pressure value of one or more pressure means as a function of the set desired and/or current measured filling pressure of the mass.

The shape of the open side and thus of the flexible abutment element is adapted to the shape of the moulding member with which the mass supply member comes into contact. When using a moulding drum as moulding member, the flexible abutment element advantageously has a curved shape—viewed in the axial direction of the moulding drum—corresponding to an arc section of the moulding drum. In the case of a flat moulding plate which moves linearly, for example to and fro, and which comprises mould cavities, the abutment element usually has a rectangular shape, viewed in the direction of movement of the moulding plate. In the case of a flat moulding disc which is arranged so as to be rotatable about an axis and has mould cavities, the abutment element usually has a curved shape, viewed in the axial direction of the moulding disc, in accordance with an arc section thereof.

Advantageously, in addition to said pressure elements expandable under fluid pressure, the pressure means comprise one or more chambers which preferably extend parallel to the pressure elements, which chambers are arranged between the pressure elements and the flexible abutment element in order to be able to readily compensate for unevenness of the moulding member, for example a non-constant radius of a moulding drum. On the outer circumference, the housing may be provided with reinforcement ribs or strips which extend in the axial and/or circumferential direction in order to impart the desired strength and rigidity to the structure.

According to a further aspect, the invention relates to a moulding device for moulding three-dimensional products from a mass of foodstuff starting materials suitable for consumption, in particular a meat mass, comprising a moulding member which can be displaced in a direction of movement by associated drive means and has at least one mould cavity provided in a face thereof, a supply member for supplying said mass to a mass-distributing device according to the invention which is arranged at a mass supply position along the movement path of the moulding member for distributing the mass over the mould cavities.

Preferably, the moulding member comprises a drum rotatable in a direction of rotation and comprising a drum wall, which drum is provided with mould cavities which are open along the outer circumference of the drum and are delimited by a bottom and upright walls or a drum which is rotatable in a direction of rotation and comprises mould cavities.

According to yet another aspect, the invention relates to a method for operating a mass-distributing device according to the invention, in which the contact pressure in one or more zones of the flexible abutment element is set in accordance with the following equations, in which $P_{fill}$ is the filling pressure:

pre-filling zone: $P \approx P_{fill}$, for example $P_{fill} - 1 \text{ atm} < P < P_{fill} + 1 \text{ atm}$ levelling zone: $P > P_{fill}$, preferably $P \gg P_{fill}$ post-filling zone: $P > P_{fill}$ relaxation zone: $P < P_{fill}$, and/or edge zone: $P > P_{fill}$.

The invention furthermore relates to a mass-distributing device for supplying a mass of foodstuff starting materials suitable for consumption, in particular a meat mass, to one or more mould cavities of a moulding member for moulding three-dimensional products from said mass, comprising a housing which has a side which is designed to be turned towards the moulding member, which side is provided with a flexible abutment element for abutting the moulding member, in which a through-passage for said mass extends in the housing from an introduction opening in the housing to a discharge, which discharge opens at the side of the housing which is designed to be turned towards the moulding member, in which the discharge and the moulding member can be moved relative to one another in a relative direction of movement, and in which pressure means are provided in order to position the flexible abutment element under pressure against a face of the moulding member comprising one or more mould cavities, in which the flexible abutment element comprises separate zones, and the pressure means are designed to set contact pressures in each zone independently of the setting of contact pressures in at least one of the other zones of the flexible abutment element. This mass distributing device may be designed in accordance with the feature of one of claims 2-15 and/or according to one or more of the features mentioned in this description.

The invention also relates to a moulding device for moulding three-dimensional products from a mass of foodstuff starting materials suitable for consumption, in particular a meat mass, comprising:

a moulding member which can be displaced by associated drive means in a direction of movement and has a moulding surface (parallel to the direction of movement) and one or more mould cavities in the moulding member which are open in the moulding surface, a mass-distributing device for supplying said mass to the one or more mould cavities of the moulding member for moulding three-dimensional products from said mass, which mass-distributing device is arranged at a mass supply position along the movement path of the moulding member, a supply member for supplying said mass to the mass-distributing device under a filling pressure, in which the mass-distributing device comprises:

a housing, which has a side which is turned towards the moulding surface of the moulding member, in which a through-passage for said mass extends in the housing from an introduction opening connected to the supply member in the housing to a discharge, which discharge opens at the side of the housing turned towards the moulding member, in which a flexible abutment element is provided for the housing of the mass-distributing device to abut the moulding member, in which settable pressure means are provided in order to position the flexible abutment element under a contact pressure against the moulding surface of the moulding member comprising one or more mould cavities, characterized in that the flexible abutment element comprises separate zones, and in that the pressure means are designed to set the contact pressure in said several separate zones of the flexible abutment element independently.

This moulding device may be designed according to the feature of one of claims 1-15 and/or according to one or more of the features mentioned in this description.

It is possible for the abutment element to be plate-shaped and to comprise one or more plate parts. It is also possible for the moulding member to be a cylindrical moulding member which is rotatable about an axis of rotation, in which said moulding surface forms the outer circumferential surface of the moulding member and the one or more mould cavities on the outer circumferential surface of the moulding member are open, and in which the abutment element is of a curved plate-shaped design.

Furthermore, a measuring device may be provided for measuring the filling pressure, with the pressure means being coupled to said measuring device and being designed to influence the contact pressure in one or more zones of the flexible abutment element. It is also possible for each zone to be associated with a pressure element which can expand under fluid pressure, and a pressure-measuring device for measuring the pressure in said pressure element. The pressure-measuring device may be connected to a control device comprising a display for set and/or measured pressures.

BRIEF DESCRIPTION OF THE DRAWINGS

The invention will be described below with reference to the attached drawing, in which.

DETAILED DESCRIPTION OF THE INVENTION

Figure 1:
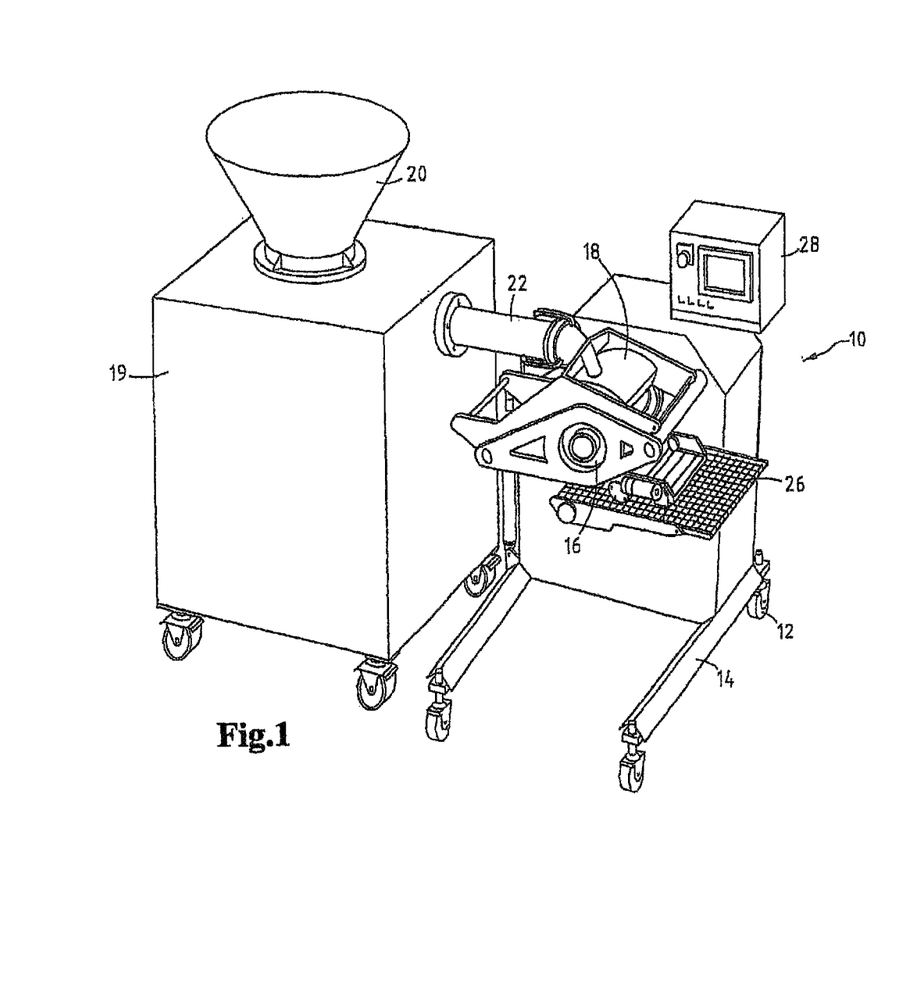
FIG. 1 shows a diagrammatic perspective view of an embodiment of a moulding device according to the invention.

FIG. 1 shows a view in perspective of an embodiment of a moulding device according to the invention. The moulding device is denoted overall by reference numeral 10. The moulding device 10 comprises a frame 14 which can be displaced by means of castors 12. A moulding member 16, in this case a moulding drum which is arranged rotatably about a horizontal axis and which is, for example, driven by a drive means (not shown in more detail) such as an electric motor, is arranged on the frame 14. The moulding member 16 is provided with mould cavities which are not visible in FIG. 1, in this case on the outer circumference of the moulding drum. A mass-distributing device 18 according to the invention for distributing a mass to be moulded over the mould cavities of the moulding member 16 is in close contact therewith in a manner which is described in more detail below. A displaceable supply device 19 with introduction funnel 20 and a ((semi)continuously operating)

pump (not illustrated) is connected to the mass-distributing device 18 by means of a detachable connecting tube 22. Below the moulding member 16 and the mass-distributing device 18, a conveyor 26, in this case an endless discharge belt, is arranged on which products released from the mould cavities are deposited and for example moved to the next processing station, such as an egg-white-coating device, a breading device, freezing device or packaging device. A control unit 28 is provided in order to control the various parts of the moulding device 10.

Figure 2:
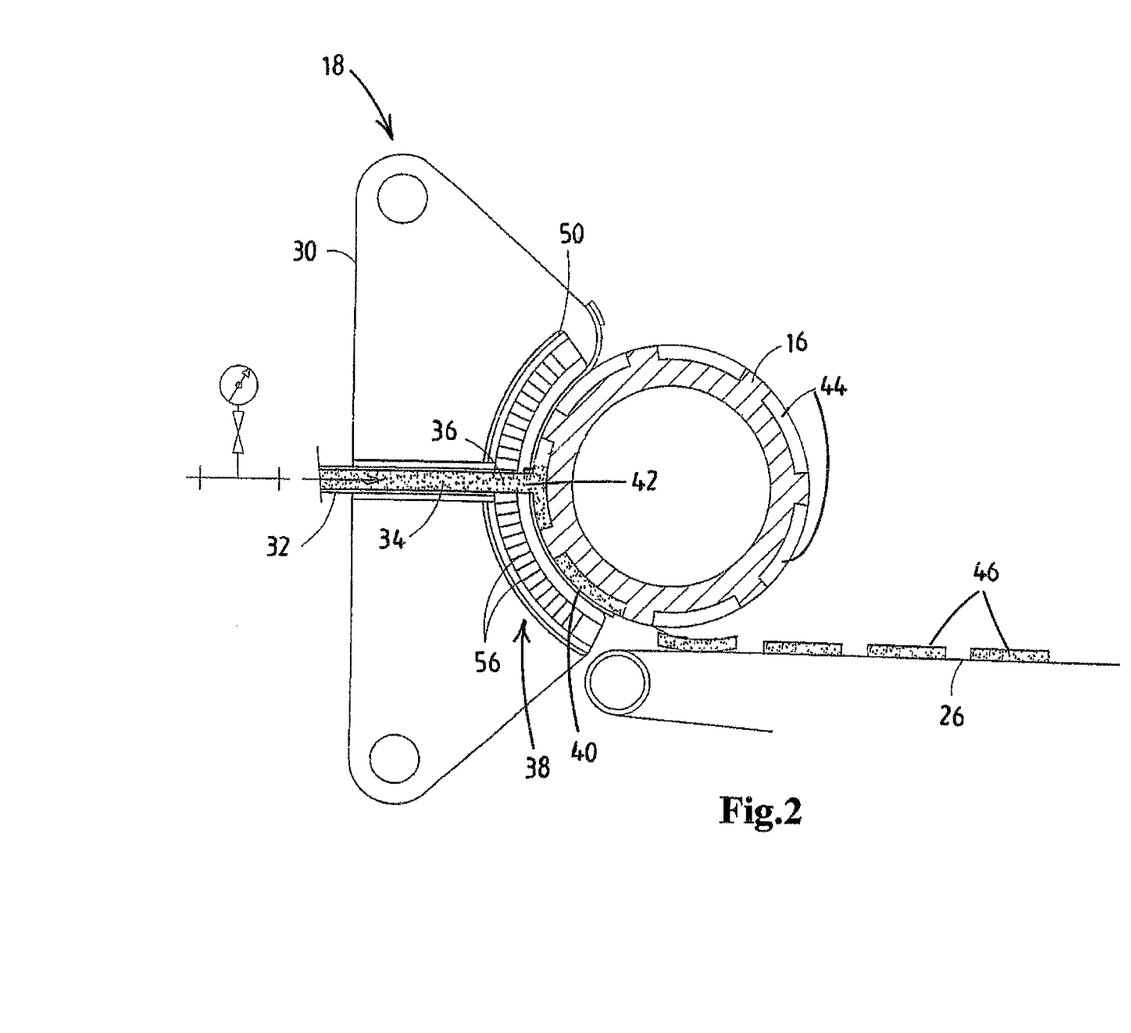
FIG. 2 shows a diagrammatic view of an embodiment of a mass-distributing device according to the invention.

FIG. 2 diagrammatically shows a cross section of an embodiment of a mass-distributing device 18 according to the invention. The mass-distributing device 18 comprises a housing 30 having an introduction opening 32 which is coupled to the mass supply device 19 via the connecting tube 22. From the introduction opening 32, a through-passage 34 extends through the housing 30 in a substantially radial direction of the moulding member 16, which passage 34 ends in or widens to a discharge 36 which extends across the width (axial direction) of the moulding member 16 on an open side 38 of the housing 30, in which a flexible abutment element 40 is provided to allow the distributing device 18 to abut the moulding member 16. The open side 38 of the housing 30 is virtually semicircular, in accordance with an arc section of the cylindrical periphery of the moulding member 16. The flexible abutment element 40 has a through-opening 42 which sealingly adjoins the discharge 36 of the through-passage 34. The moulding member 16 is provided with mould cavities 44 on the outer circumference of the cylindrical body. Mass is passed from the introduction opening 32 through the through-passage 34 and via the discharge 36 and the through-opening 42 in the flexible abutment element 40 into the mould cavities 44 which move past the through-opening 42 upon rotation of the moulding member 16. After being released from the mould cavities 44, moulded products 46 are placed on the conveyor 26 and transported away.

Figure 3:
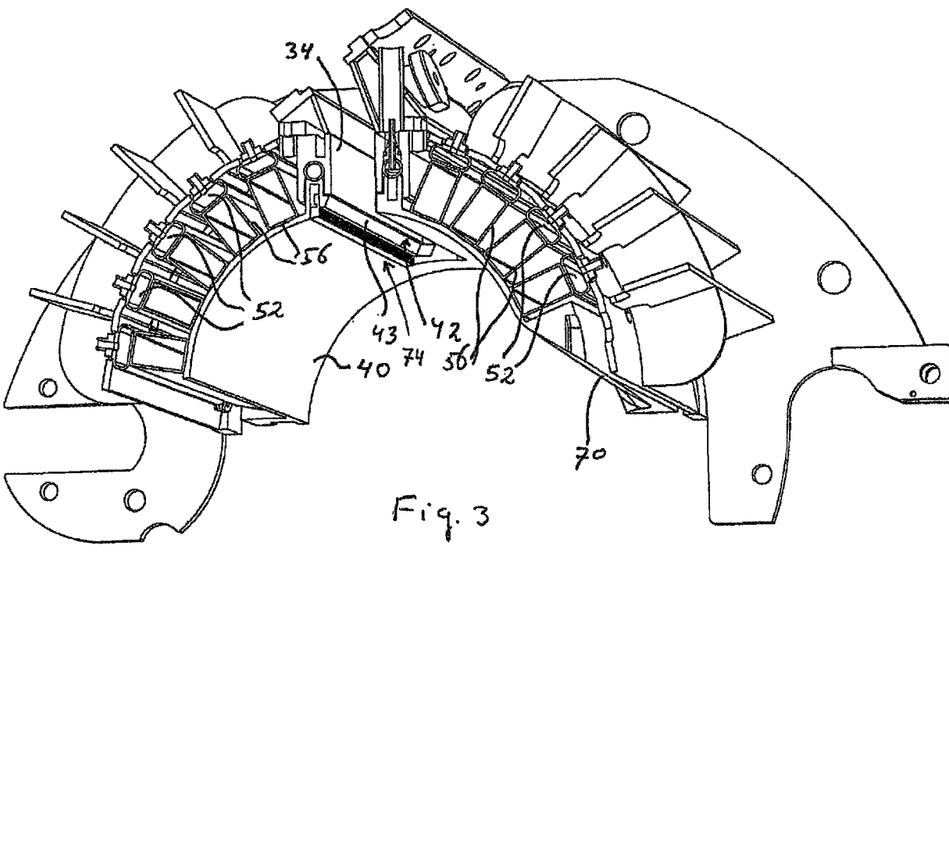
FIGS. 3 and 4 show diagrammatic views of details of an embodiment of a mass-distributing device according to the invention.
Figure 4:
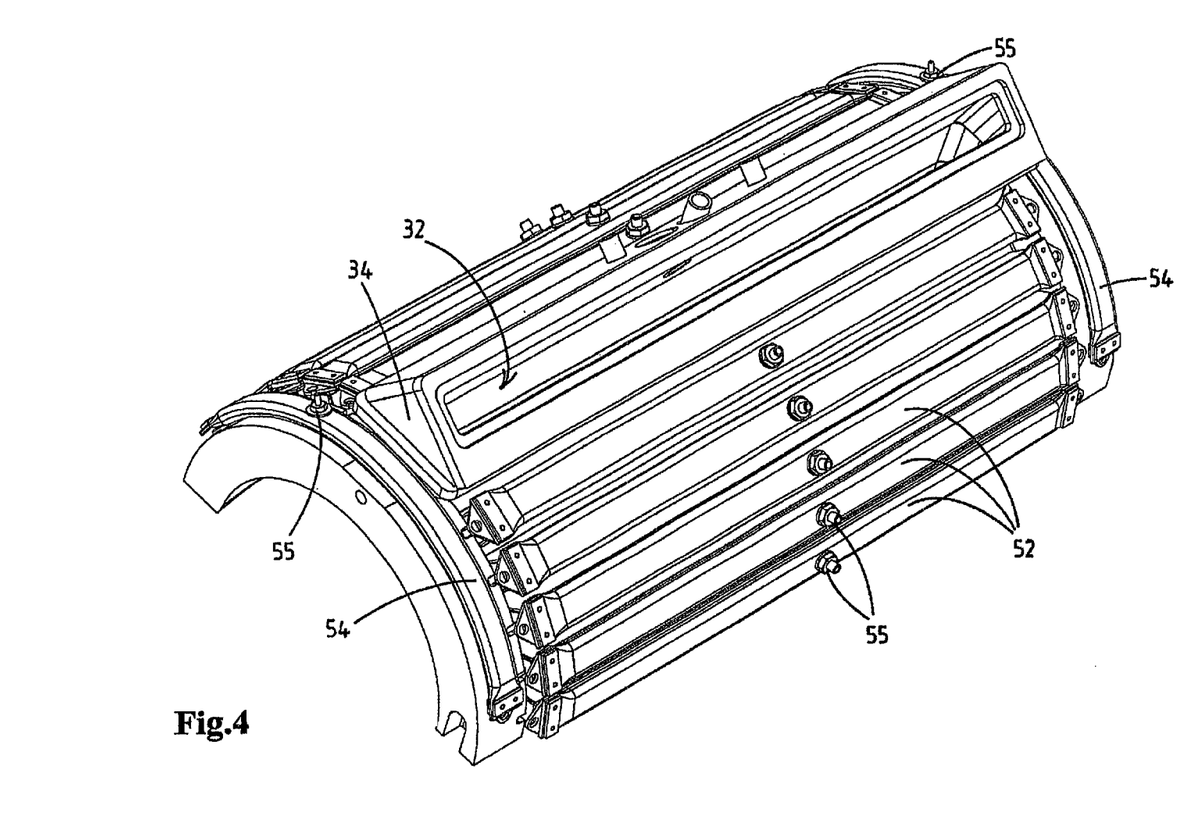

As can be seen more clearly in FIGS. 3 and 4, pressure means 50 are provided near the open side 38 of the housing 30 for each of the zones of the flexible abutment element 40 to be described below. The pressure means 50 comprise—see in particular FIG. 4—a plurality of individual pressure elements 52 which can expand under fluid pressure, for example of pressurized air or pressurized liquid such as water, such as hoses which extend in the axial direction and are connected to a source of pressurized fluid (not shown). Furthermore, a plurality of similar individual pressure elements 54 are provided along the semicircular outer edges of the housing and extend along these outer edges in the circumferential direction. The pressure elements 52 and 54 can be set for each zone or individually to a predetermined contact pressure which may be, and in practice also is, different for each zone. To this end, the pressure elements 52, 54 are connected via connecting couplings 55 to a source of pressurized fluid, such as pressurized air. Between the pressure elements 52, 54 and the flexible abutment element 40, chambers 56 which extend in the axial and radial direction are provided, in this case box profiles having a rectangular cross section, and make it possible to compensate for any deviations or unevenness of the drum circumference. To this end, the head-end walls of the housing are provided with openings extending in the radial direction for accommodating the head-end sides of said chambers 56, which are arranged therein so as to be displaceable in the radial direction. FIG. 3 shows that, in the illustrated embodiment of the flexible element 40, the through-opening 42 has vertical walls 43 which adjoin the through-passage 34 in the radial direction. As shown in FIG. 4, the plurality of individual elongated pressure elements 52, each extending in a longitudinal direction of the flexible abutment element 40, are arranged circumferentially along the flexible abutment element 40. Each of the plurality of individual pressure elements 52, which is provided along the semicircular outer edges in the circumferential direction, extends in a direction perpendicular to the longitudinal direction of the flexible abutment element 40.

FIG. 3 furthermore shows that the flexible abutment element 40 on the upstream end (assuming that the moulding member 16 rotates in an anti-clockwise direction) has an entry side 70 which slopes radially obliquely inwards in the direction of the first contact pressure zone and is V-shaped in the axial direction or width direction. Meat mass which has leaked at the front despite the pressure zones which are still to be described in detail, is still carried along by the rotating movement of the moulding member, and is forced to the centre under the entry side 70 as a result of the height reduction and the V-shape. This FIG. 3 also shows a levelling area 74 (see FIG. 5) in the shape of a blade, formed by an acute angle between the main surface area of the abutment element 40 and the vertical wall 43, which delimits the through-opening 42 on the downstream side (relative to the direction of movement of the moulding member 16).

Figure 5:
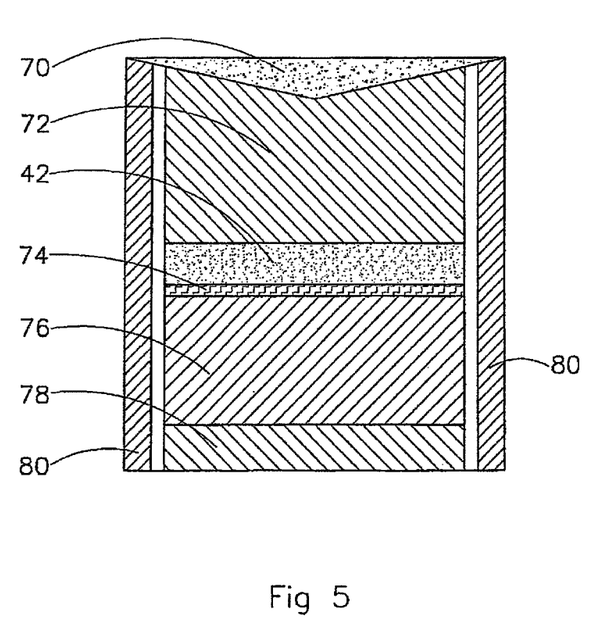
FIG. 5 shows a diagrammatic view of different zones of the flexible abutment element.

In the illustrated embodiment, the following contact pressure zones can be distinguished from the entry side 70, as diagrammatically illustrated in FIG. 5 in projection. Adjacent to the entry side 70, there is a pre-filling zone 72 with pre-filling zone pressure means having sufficiently large dimensions to cover a mould cavity 44 or a row of mould cavities extending in the axial direction of the moulding member 16. Mass is poured into the flexible abutment element 40 in the mould cavities of the moulding member at a filling pressure determined by the mass supply member of the moulding device, such as a pump or screw, from the discharge 36 through the through-opening 42, also referred to as the filling zone. The levelling zone 74 is situated adjacent to the through-opening 42 and here the contact pressure is set to such a high level by means of levelling zone pressure means that tendons, fibres and the like are cut between this part of the flexible abutment element 40 and the moulding member 16. Adjoining this levelling zone 74, there is a post-filling zone 76 with associated post-filling zone pressure means which are subjected to a higher contact pressure than the filling pressure and this prevents a mass poured into a mould cavity from being able to flow backwards (downstream). This zone 76 also has dimensions which are sufficiently large to cover a mould cavity in the circumferential direction. In an adjoining relaxation zone 78, the contact pressure is set lower than the filling pressure by means of relaxation zone pressure means, as a result of which gases trapped in the moulded mass can expand. Edge zones 80 are defined along the longitudinal edges and can be pressurized with the aid of the edge zone pressure means 54.

The following table shows the contact pressure relative to the filling pressure ($P_{fill}$) for each of the zones.

| Zone | Contact pressure | Aim |
| --- | --- | --- |
| Entry side | — | Entraining leaked mass |
| Pre-filling zone | ≈$P_{fill}$, e.g. $P_{fill}$ − 1 bar < Pre-fill < $P_{fill}$ + 1 bar | Preventing leakage to entry surface Allowing trapped air to escape from the mould cavity |
| Filling zone | $P_{fill}$, e.g. < 4 bar, in particular < 3 bar | Filling mass into the mould cavity |

-continued

| Zone | Contact pressure | Aim |
| --- | --- | --- |
| Levelling zone | $\gg P_{fill}$ e.g. $2 * P_{fill}$ | Cutting tendons, fibres etc. |
| Post-filling zone | $> P_{fill}$, e.g. $P_{fill} + 1$ bar | Preventing leakage to relaxation zone and ensuring flexible abutment element presses onto moulding member |
| Relaxation zone | $< P_{fill}$, e.g. $P_{fill} - 1$ bar | Allowing gas bubbles trapped in the mass to expand |
| Edge zone | $> P_{fill}$, e.g. $P_{fill} + 1$ bar | Preventing leakage to lateral edges |

As is shown in FIG. 2, in this exemplary embodiment, viewed in the circumferential direction the length of the mould cavities 44 of the moulding member 16 is greater than the height of the discharge 36. As the mould cavity 44 passes the discharge 36, a portion of the mould cavity 44 extends beyond the discharge 36. A portion of the mould cavity 44 which is connected to the discharge 36 is situated downstream of the discharge 36, that is to say at the location of the levelling zone 74 and/or the post-filling zone 76. It is possible to set the pressure in the levelling zone 74 and/or the post-filling zone 76, if desired temporarily, to be smaller than or equal to the filling pressure ($P_{fill}$). As a result thereof, the flexible abutment element 40 can move slightly away from the moulding member 16 directly downstream of the discharge 36, that is to say at the location of the levelling zone 74 and/or the post-filling zone 76, so that more meat mass can be passed to the mould cavity 44 of the moulding member 16 associated with the discharge 36. As a result thereof, the shaped weight of the moulded product in the mould cavity 44 increases.

Figure 6:
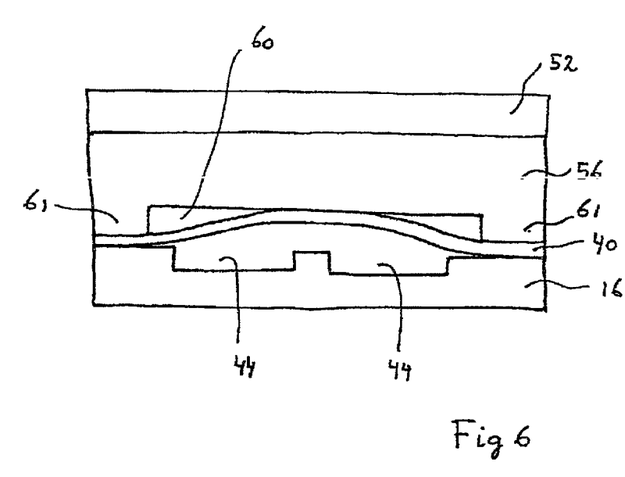
FIG. 6 shows a diagrammatic view (not to scale) of a detail of a further embodiment of a mass-distributing device according to the invention.

FIG. 6 diagrammatically shows a detail (not to scale) of a further embodiment of a mass-distributing device according to the invention. Identical or similar parts therein are denoted by the same reference numerals. In this exemplary embodiment, the moulding member 16 comprises two rows of mould cavities 44 next to one another. Obviously, the moulding member 16 may be wider, so that more than two rows of mould cavities 44 can be provided.

As is shown in FIG. 6, on their underside which is turned towards the moulding member, the profiled sections 56 may be provided in their longitudinal direction with a recess 60, the size of which is exaggerated in the illustration. On their underside, on their axial ends, the profiled sections 56 comprise two respective base portions 61 which substantially adjoin the flexible abutment element 40. The flexible abutment element 40 runs between the base portions 61 in a curved manner in the recess 60. As a result thereof, the shaped weight of the moulded products can increase, while little, if any, leaking away of the meat mass at the axial ends occurs.

The invention is not limited to the above-described embodiments. Those skilled in the art may be able to think of various modifications which are within the scope of the invention. Thus, it is for example possible to measure the weight of the moulded product, optionally automatically, with the contact pressures in the levelling zone and/or the post-filling zone and/or relaxation zone being set on the basis of the measured weight.

The invention claimed is:

1. A method for operating a moulding device for moulding three-dimensional products from a mass of foodstuff starting materials suitable for consumption, the method comprising the steps of:

providing a cylindrical moulding member rotatable in a rotation direction by an associated drive device, the cylindrical moulding member including at least one mould cavity provided on an outer circumference thereof;

providing a supply member configured to supply said mass of foodstuff starting materials to a mass-distributing device;

providing the mass-distributing device for supplying said mass of foodstuff starting materials to said at least one mould cavity of the cylindrical moulding member, said mass-distributing device comprising:

a housing including a side turned towards the cylindrical moulding member, said side being provided with a curved flexible abutment element abutting an arc section of the cylindrical moulding member, in which a through-passage for said mass extends in the housing from an introduction opening, into which said supply member supplies said mass, to a discharge, wherein said discharge opens at the side of the housing which is turned towards the cylindrical moulding member, the curved flexible abutment element comprising a plurality of separate zones arranged in succession in a circumferential direction of the curved flexible abutment element; and a pressure device configured to position the curved flexible abutment element under contact pressure against the outer circumference of the cylindrical moulding member, wherein the pressure device comprises a plurality of individual pressure elements configured to separately set a contact pressure in each of the plurality of separate zones of the curved flexible abutment element, wherein the pressure device further comprises a plurality of individual edge zone pressure elements provided along one or both semi-circular outer edges of the curved flexible abutment element, the plurality of individual edge zone pressure elements being configured to set a further contact pressure in a plurality of individual edge zones situated along the one or both semi-circular outer edges of the curved flexible abutment element, independently of setting of said respective contact pressure in at least one of said separate zones of the curved flexible abutment element by the plurality of individual pressure elements; and separately setting said contact pressures in each of said plurality of separate zones of the curved flexible abutment element and in said plurality of individual edge zones.

2. The method according to claim 1, wherein each of the plurality of individual pressure elements and the plurality of individual edge zone pressure elements comprises a member expanded under fluid pressure and connected to a source of pressure fluid under superatmospheric pressure.

3. The method according to claim 1, wherein each of the plurality of individual pressure elements and the plurality of individual edge zone pressure elements is elongated, and wherein the plurality of individual edge zone pressure elements are provided along one or both semi-circular outer edges of the curved flexible abutment element and the plurality of individual pressure elements extend in a longitudinal direction of the curved flexible abutment element.

4. The method according to claim 3, wherein each of the plurality of individual pressure elements comprises an elongate profiled section, the elongate profiled sections being arranged at a distance from one another on a side of the curved flexible abutment element which is turned away from the cylindrical moulding member, and an expandable member engaging with the elongate profiled section of a respective individual pressure element in order to exert a pressure force on the curved flexible abutment element via the elongate profiled section.

5. The method according to claim 4, wherein the elongated profiled section of each of the plurality of individual pressure elements includes, on the side thereof which is turned toward the cylindrical moulding member, two base portions defining a recess therebetween, said two base portions substantially adjoining the curved flexible abutment element, and wherein the curved flexible abutment element forms a curved shape in said recess.

6. The method according to claim 1, wherein at least one of the plurality of individual pressure elements and/or at least one of the plurality of individual edge zone pressure elements comprises a member which is operated to expand electrically.

7. The method according to claim 1, wherein the mass-distributing device further comprises at least one contact pressure sensor in each of the plurality of separate zones of the curved flexible abutment element configured to detect the contact pressures and a control unit configured to receive said contact pressures from said at least one contact pressure sensor, and wherein the step of setting said contact pressures is performed by the control unit.

8. The method according to claim 7, wherein the control unit further comprises a memory for storing one or more sets of contact pressures associated with cylindrical moulding members, and wherein the method further comprises the step of recognizing the cylindrical moulding member in the moulding device and setting the contact pressures by the control unit based on the set of stored contact pressures associated with the recognized cylindrical moulding member.

9. The method according to claim 1, wherein the plurality of separate zones of the curved flexible abutment element comprise a levelling zone defined by a section of the curved flexible abutment element which, viewed in the rotation direction of the cylindrical moulding member, is situated downstream of and adjoining the discharge, a post-filling zone defined by a section of the curved flexible abutment element which, viewed in the rotation direction of the cylindrical moulding member, is situated downstream of and adjoining the levelling zone, and a relaxation zone defined by a section of the curved flexible abutment element which, viewed in the rotation direction of the cylindrical moulding member, is situated downstream of and adjoining the post-filling zone.

10. The method according to claim 9, further comprising the step of setting the contact pressures in said one or more levelling zones, post-filling zones, relaxation zones and edge zones of the curved flexible abutment element in accordance with the following equations, wherein P is the contact pressure of the respective zone and $P_{fill}$ is a filling pressure at which the mass is supplied from the discharge into the at least one mould cavity of the cylindrical moulding member:
the levelling zone: $P \gg P_{fill}$,
the post-filling zone: $P > P_{fill}$,
the relaxation zone: $P < P_{fill}$, and
the edge zones: $P > P_{fill}$.

11. The method according to claim 9, further comprising the step of setting the contact pressures in the levelling zone and/or the post-filling zone smaller than or equal to a filling pressure at which the mass is supplied from the discharge into the at least one mould cavity of the cylindrical moulding member.

12. A method for operating a moulding device for moulding three-dimensional products from a mass of foodstuff starting materials suitable for consumption, the method comprising the steps of:
providing a cylindrical moulding member rotatable in a rotation direction by an associated drive device, the cylindrical moulding member including at least one mould cavity provided on an outer circumference thereof,
providing a supply member configured to supply said mass of foodstuff starting materials to a mass-distributing device;
providing the mass-distributing device for supplying said mass of foodstuff starting materials to said at least one mould cavity of the cylindrical moulding member, said mass-distributing device comprising:
a housing including a side turned towards the cylindrical moulding member, said side being provided with a curved flexible abutment element abutting an arc section of the cylindrical moulding member, in which a through-passage for said mass extends in the housing from an introduction opening, into which said supply member supplies said mass, to a discharge, wherein said discharge opens at the side of the housing which is turned towards the cylindrical moulding member, the curved flexible abutment element comprising a plurality of separate zones arranged in succession in a circumferential direction of the curved flexible abutment element; and
a pressure device configured to position the curved flexible abutment element under contact pressure against the outer circumference of the cylindrical moulding member, wherein the pressure device comprises a plurality of individual pressure elements configured to separately set a contact pressure in each of the plurality of separate zones of the curved flexible abutment element,
wherein the plurality of separate zones of the curved flexible abutment element comprises a levelling zone defined by a section of the curved flexible abutment element which, viewed in the rotation direction of the cylindrical moulding member, is situated downstream of and adjoining the discharge, a post-filling zone defined by a section of the curved flexible abutment element which, viewed in the rotation direction of the cylindrical moulding member, is situated downstream of and adjoining the levelling zone, and a relaxation zone defined by a section of the curved flexible abutment element which, viewed in the rotation direction of the cylindrical moulding member, is situated downstream of and adjoining the post-filling zone;
setting the contact pressure P in the levelling zone in accordance with the following equation, in which $P_{fill}$ is a filling pressure at which the mass is passed from the discharge into the at least one mould cavity of the cylindrical moulding member: $P \gg P_{fill}$;
preventing leakage of mass to the relaxation zone and ensuring that the curved flexible abutment elements presses onto the cylindrical moulding member by setting the contact pressure P in the post-filling zone in accordance with the following equation, in which $P_{fill}$ is the filling pressure at which the mass is passed from the discharge into the mould cavities of the cylindrical moulding member: $P>P_{fill}$; and allowing gas bubbles trapped in the mass to expand by setting the contact pressure P in the relaxation zone in accordance with the following equation, in which $P_{fill}$ is the filling pressure at which the mass is passed from the discharge into the mould cavities of the cylindrical moulding member: $P<P_{fill}$.

13. The method according to claim 12, wherein the mass-distributing device further comprises at least one contact pressure sensor in each of the plurality of separate zones of the curved flexible abutment element configured to detect the contact pressures, and a control unit configured to receive said contact pressures from said at least one contact pressure sensor, and wherein the step of setting the contact pressures is performed by the control unit.

14. The method according to claim 13, wherein the control unit further comprises a memory for storing one or more sets of contact pressures associated with cylindrical moulding members, and wherein the method further comprises the step of recognizing the cylindrical moulding member in the moulding device and setting the contact pressures by the control unit based on the set of stored contact pressures associated with the recognized cylindrical moulding member.

15. The method according to claim 13, further comprising the steps of:
providing a filling pressure sensor for measuring the current filling pressure; and
setting a desired filling pressure in the control unit,
wherein the step of setting the contact pressures is performed by the control unit using an algorithm which controls said contact pressures as a function of the set desired and/or current filling pressure.

16. The method according to claim 12, further comprising the steps of measuring a weight of a moulded product and automatically setting the contact pressures in one or more of the levelling zone, the post-filling zone and relaxation zone based on the measured weight.

17. A method for operating a moulding device for moulding three-dimensional products from a mass of foodstuff starting materials suitable for consumption, the method comprising the steps of:
providing a cylindrical moulding member rotatable in a rotation direction by an associated drive device, the cylindrical moulding member including at least one mould cavity provided on an outer circumference thereof,
providing a supply member configured to supply said mass of foodstuff starting materials to a mass-distributing device;
providing the mass-distributing device for supplying said mass of foodstuff starting materials to said at least one mould cavity of the cylindrical moulding member, said mass-distributing device comprising:
a housing including a side turned towards the cylindrical moulding member, said side being provided with a curved flexible abutment element abutting an arc section of the cylindrical moulding member, in which a through-passage for said mass extends in the housing from an introduction opening, into which said supply member supplies said mass, to a discharge, wherein said discharge opens at the side of the housing which is operable to be turned towards the cylindrical moulding member, the curved flexible abutment element comprising a plurality of separate zones arranged in succession in a circumferential direction of the curved flexible abutment element; and
a pressure device configured to position the curved flexible abutment element under pressure against the outer circumference of the cylindrical moulding member, wherein the pressure device comprises a plurality of individual pressure elements configured to separately set a contact pressure in each of the plurality of separate zones of the curved flexible abutment element,
wherein the plurality of separate zones of the curved flexible abutment element comprises a pre-filling zone which is defined by a section of the curved flexible abutment element which, viewed in the rotation direction of the cylindrical moulding member, is situated upstream of the discharge, a levelling zone defined by a section of the curved flexible abutment element which, viewed in the rotation direction of the cylindrical moulding member, is situated downstream of and adjoining the discharge, a post-filling zone defined by a section of the curved flexible abutment element which, viewed in the rotation direction of the cylindrical moulding member, is situated downstream of and adjoining the levelling zone, and a relaxation zone defined by a section of the curved flexible abutment element which, viewed in the rotation direction of the cylindrical moulding member, is situated downstream of and adjoining the post-filling zone; and
separately setting the contact pressures in each of said pre-filling zone, levelling zone, post-filling zone and relaxation zone of the curved flexible abutment element, in accordance with the following equations, in which P is the contact pressure in a respective zone and $P_{fill}$ is a filling pressure at which the mass is passed from the discharge into the at least one mould cavity of the cylindrical moulding member:

the pre-filling zone: $P_{fill}-1$ bar $<P<P_{fill}+1$ bar,
the levelling zone: $P>>P_{fill}$,
the post-filling zone: $P>P_{fill}$,
the relaxation zone: $P<P_{fill}$.

18. The method according to claim 17, wherein multiple of the plurality of individual pressure elements are arranged in the pre-filling zone and are each configured to separately set a contact pressure in a part of the pre-filling zone of the curved flexible abutment element.

19. The method according to claim 17, wherein each of the plurality of individual pressure elements comprises a member expanded under fluid pressure and connected to a source of pressure fluid under superatmospheric pressure.

20. The method according to claim 17, wherein each of the plurality of individual pressure elements is elongated and the plurality of individual pressure elements extend in a longitudinal direction of the curved flexible abutment element.

* * * * *